Dec. 5, 1967   J. L. EISENMANN ET AL   3,356,607
REINFORCED ION-EXCHANGE MEMBRANES
Filed July 22, 1964
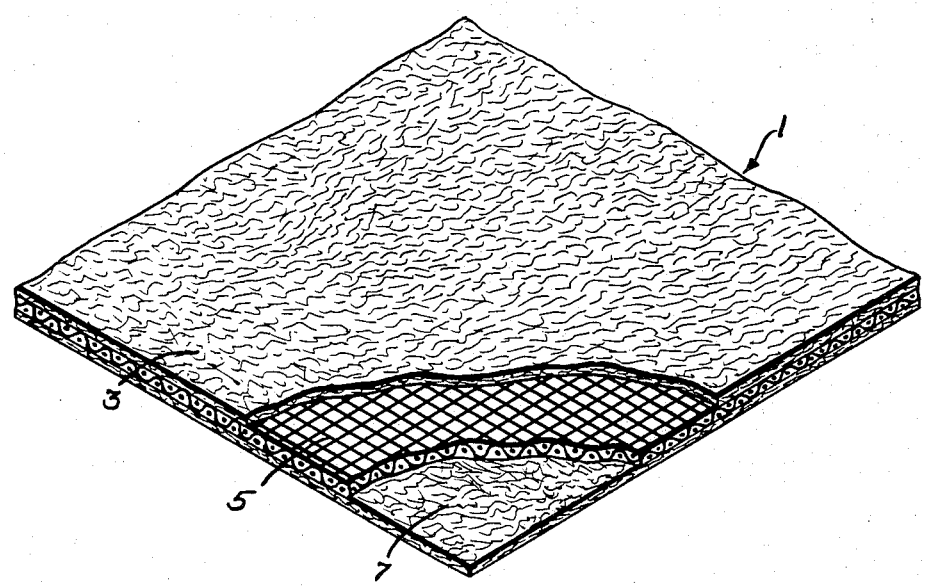
Inventors:
John L. Eisenmann,
Samuel S. Alexander,
by Aaron Tushin
Attorney

3,356,607
REINFORCED ION-EXCHANGE MEMBRANES
John L. Eisenmann, Hingham, and Samuel S. Alexander, Boxboro, Mass., assignors to Ionics, Incorporated, Cambridge, Mass.
Filed July 22, 1964, Ser. No. 384,316
7 Claims. (Cl. 204—301)

This invention relates to electrically conductive, insoluble, synthetic, organic, polymeric, ion-exchange structures in the form of sheets, tubes or other shapes, and to their method of manufacture. More particularly the invention is directed to homogeneous, permselective, ion-selective membranes having a plurality of sheets of reinforcing materials contained therein.

Many uses have been found for permselective membranes. One use is the demineralization of water by removing the salts therefrom. Another use is the concentration of dilute spent pickling acids, waste salts, and alkalis, which result as by-products of chemical processes. Still another use is the demineralization of proteins. Another use is the separation of amphoteric ions from non-amphoteric ions, and certain ions from others having different mobility or electron charges. Another use which has become most important is the decomposition of ionic solutions by electrolysis where it is desired to maintain the decomposition products separate from one another. An important example of the latter is the electrolysis of sodium chloride solution where it is desired to keep the sodium hydroxide which is produced separate from the reactant sodium chloride. Another example is the production of substantially pure carbonates during electrolysis by introducing carbon dioxide into caustic solutions which are maintained substantially free of chloride ions.

Apparatus employing ion-exchange membranes and their method of operation to effect the above-mentioned uses are more fully described in U.S. Patents Nos. Re. 24,865, 2,708,658, 2,848,403, 2,826,544, and many others.

Homogeneous ion-exchange resins have high ionic permselectivity and high hydraulic resistivity. These resins have a solid phase consisting of a synthetic polymer with covalently bonded dissociable ion-exchange groups and mobile replaceable counter ions associated with them. They are highly electrically conductive and can be formed into dimensional structures such as sheets or membranes. To increase the mechanical strength of the membrane article itself and to allow their manufacture in reasonably large sizes, a reinforcing material is advantageously imbedded therein. The prior art employed a reinforcing or backing structure consisting of a single sheet of a relatively inert material as, for example, glass having a woven or mesh cloth structure. The great majority of the woven materials employed as a backing material are to a large extent hydrophobic and possess chemical and physical properties which are quite different from that of the hydrophilic ion-exchange resin. For this reason a firm bond between the woven backing material and the exchange resin is not invariably produced and results in a membrane structure having a physical stability inadequate over continuous periods of time, especially in a corrosive environment.

It is, therefore, an object of this invention to prepare self-supporting ion-exchange structures of homogeneous ion-exchange material in which a plurality of sheets of a reinforcing or backing material are imbedded therein.

Another object is to produce anion and cation permselective membranes containing the combination of sheets of backing material having a non-woven and woven type fabric structure.

Another object is to produce homogeneous ion-exchange membranes containing three sheets of a backing fabric, said membrane possessing excellent physical stability and of a size sufficiently large for use in commercial applications.

Another object is to fabricate reinforced ion-exchange membranes which are mechanically durable, selectively permeable, electrically conductive, and substantially hydraulically impermeable for use as hydraulic separators, especially in the field of electrodialysis.

Other objects, features and advantages of the invention will in part be obvious and will in part appear hereinafter.

For a fuller understanding of the nature and objects of the invention reference should be made to the following detailed description and the accompanying drawing.

Where a homogenous ion-exchange membrane is made of a thickness substantially corresponding to that of the imbedded single sheet backing material having a woven or screen type construction, it is substantially only the interstices of the screen lattice which are filled by the ion-exchange resin. Over a prolonged period of usage, the ion-exchange material filling the lattices gradually crumbles away, particularly when in contact with hot corrosive solutions or where there are changes in swelling of the exchange resin. In order to avoid these disadvantages attempts were made to make the membranes thicker by employing heavier gauge screen support material or by employing two sheets of the screen material. This procedure was unsatisfactory and cracking and spalling of the exchange resin still occurred.

It has now been found that the aforesaid disadvantages can be avoided by imbedding a plurality of supporting sheets within the membrane in a unique arrangement to produce both anion and cation exchange membranes having increased resistance to fracture and hydraulic leakage. For any one membrane the reinforcing element is a combination of sheets comprised of at least one woven fabric and at least one non-woven fabric. The woven fabric has high burst strength, thereby imparting to the membrane rigidity and resistance to deformation under differential hydraulic pressures. The non-woven fabric in turn provides additional support for the resin across the open mesh or squares formed by the warp and filling yarns of the woven fabric. This arrangement gives a more continuous support for the resin. Where a membrane is fabricated with a double fabric support consisting of a sheet of woven fabric and one of a non-woven fabric, it is advantageous that in use the face of the membrane supported by the non-woven sheet be placed in contact with the more corrosive solution. Experience has shown that the ion-exchange resin supported by the non-woven fabric has less tendency to spall and crack than that being supported by the woven open-mesh fabrics. Therefore the preferred arrangement is to have a triple fabric supporting element wherein the middle sheet is of a woven or screen type structure sandwiched between two reinforcing sheets of a non-woven fabric material. This arrangement allows both faces of the membrane to obtain the added support of the non-woven fabric. A particularly successful triple reinforcing element has been found to be comprised of an inner layer of 8 oz. weight open mesh woven glass cloth sandwiched between two layers of a non-woven polypropylene fabric.

The membranes of the present invention are formed on the supporting element by placing the supporting sheets on a flat casting surface on top of one another in the arrangement desired. The solution of polymerizable components or partially polymerized components are poured over the support material, covered with the cast and the mass heated until polymerization is complete. For example, the mixture of polymerizable ingredients may be cast between parallel glass plates spaced from each other for a distance equal to the desired membrane thickness and then retained in a heated oven for a time sufficient to cause polymerization. During the polymerization, evaporation of any of the polymerizable material from the space between the glass plates occurs only at the edge of the cast. The dried edge will then seal the interior of the cast from additional evaporation of polymerizable material. After polymerization and cooling, the dried rough edges that form around the rim of the glass casts are trimmed off and discarded. The membranes may then be removed from between the glass plates and further treated as may be desired. In making a reinforced membrane the casting or molding method (including compression molding) is preferred but other conventional methods such as dipping, either batchwise or continuously, and multicoating may be employed. Illustrative of the type and class of homogeneous ion-exchange membranes which may be reinforced by the process of the present invention, but not limited thereto, may be mentioned those disclosed in U.S. Patents Nos. Re. 24,865, 2,730,768, 2,731,411, 2,800,445 and 2,860,097.

The accompanying drawing is a schematic representation of an ion-exchange membrane made according to the invention, illustrating a preferred arrangement of the reinforcing backing material. The membrane 1 which may be either anionic or cationic selective may be composed of a polymeric ion-exchange material having imbedded therein three sheets of a fabric material in face to face relationship with each other. The middle sheet 5 is characterized by having visibly open structures as found in woven type fabrics. The adjacent sheets 3 and 7 which support each side or face of the membrane have a matte or random oriented fiber type structure with no well-defined interstices which is characteristic of the non-woven type fabrics. The homogeneous ion-exchange resin is dispersed throughout the mass to form a single coherent solid structure.

For purposes of this invention the term "non-woven" fabric is defined as a textile structure comprising a web or mat of fibers usually held together with a bonding material. Such materials are not made by the usual processes of spinning and weaving as occurs in the manufacture of the open mesh type woven fabrics. The materials and the methods employed in the fabrication of non-woven fabrics are fully discussed in the book "Non-woven Fabrics" by F. M. Buresh, Reinhold Publishing Corporation, New York, N.Y. (1962). Most of the natural or synthetic fibers can be manufactured into mats of non-woven fabrics as well as the woven or mesh type textile fabrics. Naturally the reinforcing structure should be composed of a material or materials that are stable under the manufacturing conditions employed in the making of the ion-exchange resin, especially to the treatment by which the ion-selective groups are introduced into the membrane. Illustrative of the wide range of materials that may be employed in the manufacture of the reinforcing fabrics, but not limited thereto, are asbestos, polyesters (Dacron), polyamides (nylon), acrylics (Orlon), modacrylics (Dynel), ceramic or glass fibers, vinylidene chloride (Saran), rayons, polypropylene, tetrafluoroethylene (Teflon) and the like. Polypropylene is an exceptionally suitable material for use as the reinforcing material since it is chemically inert and readily available. Polypropylene is the preferred non-woven fabric for use in this invention. Also found to be a particularly suitable open mesh backing material are the woven glass filter cloths that are readily available in various weights and also polypropylene. Fabrics made of mixtures of two or more of the natural or synthetic fibers are also adaptable for use in the invention.

The thickness of the supported membranes made by this invention is not critical, but will of course depend on the desired use. In general, suitable membranes may be as thin as 20-thousandths of an inch to as much as one-half inch thick. The minimum thickness of a membrane will also depend on the total thickness of the supporting structure. Although the thicker membranes have a longer useful life, their electrical resistances increase porportionally to their thickness, so that if the membrane is made increasingly thicker, a value will be obtained above which the resistance is too great for practical use. Membranes fabricated with more than three sheets of backing material are also contemplated within the scope of the invention but under most conditions the triple-sheet supporting structure has been found to be adequate.

The following examples have been selected for purposes of illustration and are not presented to suggest limitations not previously described and not included in the appended claims.

The divinylbenzene used in the following examples is the commercial grade which is obtainable in several concentrations. The actual analysis of the grades used herein are given below:

| Designation | 20%–25% DVB | 40%–50% DVB | 50%–60% DVB |
| --- | --- | --- | --- |
| Divinylbenzene, percent by weight | 17 | 47 | 54 |
| Ethylstyrene, percent by weight | 49 | 43 | 40 |
| Diethylbenzene, percent by weight | 34 | 10 | 8 |

*Example 1.—Triple-fabric supported anion membrane*

| | |
| --- | --- |
| Divinylbenzene, commercial 40%–50% grade cc | 55 |
| Divinylbenzene, commercial 20%–25% grade cc | 45 |
| 2-vinylpyridine, inhibitor free cc | 32.5 |
| Diethylbenzene cc | 48.7 |
| Benzoyl peroxide g | 0.8 |

The ingredients were mixed thoroughly at room temperature and cast between two glass plates on a triple-fabric reinforcing element comprised of an inner sheet of a woven polypropylene fabric sandwiched between two sheets of non-woven polypropylene mat. A tray was filled with some of the mixture and the glass cast submerged in it. The tray was heated at 80° C. for 14 hours to form a membrane comprising a matrix of divinylbenzene-ethylvinylbenzene-vinylpyridine copolymer and a solvating liquid phase of diethylbenzene. The case was allowed to cool and the membrane removed from the glass plates and immediately leached with ethylene dichloride.

The membranes were thereafter immersed in a mixture of:

| | Parts by weight |
| --- | --- |
| Chloromethyl ether | 30 |
| Ferric chloride (anhydrous) | 3 | for 14 hours at room temperature. The excess chloromethyl ether solution was removed by leaching with methanol. The chloromethylated membranes were converted to the quaternary ammonium salt by prompt immersion in a 25% aqueous solution of trimethylamine for 24 hours at room temperature. The final membranes were yellowish in color and physically strong.

*Example 2.—Triple-fabric supported cation membrane*

| | |
| --- | --- |
| Divinylbenzene, commercial 50%–60% cc | 175 |
| Toluene cc | 175 |
| Benzoyl peroxide g | 1.0 |

The ingredients were mixed together at room temperature and poured onto a backing structure comprised of an 8 oz. woven-glass filter cloth sandwiched between two sheets of 8-thousandths of an inch thick non-woven polypropylene fabric. The mass was then cast between two glass plates and heated overnight at about 85° C. After cooling to room temperature (25° C.), the cured resin was separated from the plates as a translucent sheet. During polymerization, evaporation of solvent into the space between the plates beyond the area occupied by the case occurred primarily only at the edges of the cast. The dried edges were trimmed off and discarded. The polymerized sheet was immersed in 95% sulfuric acid and heated at 90° C. for 18 hours. Thereafter the membrane was treated briefly, first in a 1:1 mixture of sulfuric acid and water, then in a 1:3 mixture of sulfuric acid and water, and finally it was thoroughly leached in water. It was a brown, homogeneous, smooth-surfaced and strong membrane. The properties were improved somewhat, particularly with respect to physical strength, when the toluene in the polymerized sheet was replaced with ethylene dichloride prior to sulfonation. The resulting three-ply laminated membrane had a thickness of .093 cm., and in the leached sodium form it had a resistance of 18 ohm-cm.$^2$ when measured across the two faces of the membrane.

*Example 3.—Dual-fabric supported cation membrane*

The same formulation as in Example 2 was poured onto a tray. A backing structure of two supporting sheets comprised of an 8 oz. woven glass fabric and a fabric of non-woven polyethylene were laid in the liquid mix. The mass was cast and treated as in Example 2. The final membrane was .073 cm. thick with a resistance of 17 ohm-cm.$^2$.

*Example 4*

In order to compare the reinforced membranes of the present invention with those of the prior art, a life test of both types was initiated in an electrodialysis cell. In its simplest form the cell consisted of a container divided by a cation permselective membrane into an anode and cathode compartment; the compartments containing respectively a graphite anode and a nickel screen cathode. The cation membranes used were of the carboxylic type made of a copolymer of acrylic and divinylbenzene, as fully described in U.S. Patent No. 2,731,408. A saturated brine solution was employed as the feed solution to the anode compartment and a distilled water feed to the cathode compartment. A source of D.C. voltage was impressed across the electrodes at a membrane current density of 125 amps per square foot. During the electrolysis, sodium hydroxide and hydrogen gas were produced at the cathode and hydrochloric acid and chlorine gas at the anode. The flow of feed water to the cathode compartment was adjusted to obtain a steady state product of about 15% caustic solution. Both tests were operated for 400 hours, at which time the respective membranes were inspected.

The membrane of the present invention was fabricated with a reinforcing element comprising a sheet of woven polypropylene cloth sandwiched between two sheets of non-woven polypropylene fabric. This membrane showed only negligible spalling of resin on the surface in contact with the anolyte solution. The chloride contamination of the caustic product consistently analyzed to less than 0.2% based on the weight of the hydroxide concentration. This low contamination is indicative of a substantially leak-free membrane.

On the other hand the membrane fabricated with a reinforcing element consisting of a single sheet of woven polypropylene cloth was in poor physical condition at the termination of the life test. Large areas of spalling and cracking of both surfaces of the membrane were noticed. Leakage of anolyte solution through the membrane into the cathode compartment was evident in that the chloride contamination of the caustic product exceeded 1%.

As may be readily seen from the results of the life test, an unexpected improvement in the durability of ion-exchange membranes is obtained by combining both woven fabric and non-woven fabric as the supporting element. The combination of fabrics is more effective in inhibiting mechanical degradation of membranes than any single member of the combination.

While the invention has been disclosed in connection with certain examples, it is not to be construed as limiting, but is susceptible to various changes and modifications, without departing from the spirit and scope of the invention as described in the specification and defined by the appended claims.

We claim:
1. An electrically conductive homogeneous ion-exchange membrane of synthetic, high molecular weight, polymeric compounds, the improvement consisting of a multi-layered reinforcing structure imbedded therein, said structure comprised of a plurality of sheets of textile fabric materials, said reinforcing structure comprising at least one non-woven fabric in combination with at least one woven fabric, said fabrics arranged in substantially face-to-face relationship with respect to each other.
2. The membrane of claim 1 wherein the reinforcing structure comprises a single sheet of non-woven fabric in combination with a single sheet of woven fabric.
3. The membrane of claim 2 wherein the non-woven fabric is polypropylene.
4. The membrane of claim 1 wherein the reinforcing structure comprises a laminate of three sheets of textile fabric in which a woven fabric is sandwiched between two sheets of a non-woven fabric.
5. The membrane of claim 4 wherein the woven fabric is glass cloth and the non-woven fabric is polypropylene.
6. The membrane of claim 1 wherein the textile fabric materials are selected from the group consisting of polyesters, polyamides, acrylics, modacrylics, vinylidene chloride, rayons, polypropylene, asbestos, glass, tetrafluoroethylene and mixtures thereof.
7. A multi-compartment electrodialysis apparatus for transferring ions from one solution to another solution comprising liquid containing chambers defined by ion-exchange membranes and terminal electrodes for passing a direct current transversely through said chambers and membranes, the improvement in which said membranes have imbedded therein the reinforcing element as characterized in claim 1.

References Cited

UNITED STATES PATENTS

| | | | |
|---|---|---|---|
| 1,888,179 | 11/1932 | Nash | 210—507 |
| 2,731,408 | 1/1956 | Clarke | 204—296 |
| 2,967,807 | 1/1961 | Osborne et al. | 204—296 |
| 3,003,643 | 10/1961 | Thomas | 210—508 |
| 3,017,338 | 1/1962 | Butler et al. | 204—180 |
| 3,053,762 | 9/1962 | Adiletta | 210—507 |

FOREIGN PATENTS 570,269  2/1959  Canada.

JOHN H. MACK, *Primary Examiner.*

D. R. JORDAN, *Assistant Examiner.*